(12) United States Patent
Schimmel et al.

(10) Patent No.: US 7,954,622 B2
(45) Date of Patent: Jun. 7, 2011

(54) TWO-PIECE WEDGE DIVERTER GATE

(75) Inventors: Todd M Schimmel, Annandale, VA (US); Thomas C Potter, Fairfax, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 12/842,800

(22) Filed: Jul. 23, 2010

(65) Prior Publication Data
US 2010/0282571 A1    Nov. 11, 2010

Related U.S. Application Data

(62) Division of application No. 11/853,587, filed on Sep. 11, 2007, now Pat. No. 7,802,672.

(51) Int. Cl.
*B65G 47/84* (2006.01)
*B65G 47/00* (2006.01)
*B65G 47/10* (2006.01)
*B65G 47/46* (2006.01)
*B65G 47/26* (2006.01)
*B65G 47/82* (2006.01)

(52) U.S. Cl. ............... 198/367.1; 198/463.4; 198/463.6; 198/452; 198/370.07; 198/442; 198/457.07; 198/598

(58) Field of Classification Search ............... 198/463.4, 198/463.6, 452, 370.07, 367.1, 442, 457.07, 198/598
See application file for complete search history.

(56) References Cited

U.S. PATENT DOCUMENTS

| 4,176,855 | A | 12/1979 | Ingram, Jr. et al. |
| 5,346,205 | A | 9/1994 | Lawrence |
| 6,840,384 | B2 * | 1/2005 | Yurko ............... 209/652 |
| 7,114,609 | B2 | 10/2006 | Christman et al. |

OTHER PUBLICATIONS

International Search Report and Written Opinion for PCT/US07/19671 dated Mar. 24, 2008.
Texas instruments Incorporated: Technical Glossary; located at http://www.ti.com/corp/docs/inventor/dsp/glossary.htm.

* cited by examiner

*Primary Examiner* — Gene Crawford
*Assistant Examiner* — Yolanda Cumbess
(74) *Attorney, Agent, or Firm* — Knobbe Martens Olson & Bear LLP

(57) ABSTRACT

A diverter gate generally includes a bracket which connects to an actuator and a flag which releasably engages with the bracket via cooperating engagement members. The cooperating engagement members may be symmetrical, and may comprise one or more tabs and one or more corresponding receptacles. The tabs may be dimensioned slightly larger than the receptacles so as to create a positive interference fit. The bracket and the flag may include openings to receive a fastener extending substantially across the length of the gate. Tightening the fastener compresses the tab(s) against the receptacle(s) to result in a compression fit between the flag and the bracket. The two-piece design allows the flag to be easily removed and reversed or replaced, without disassembling or removing the bracket or the actuator.

20 Claims, 10 Drawing Sheets

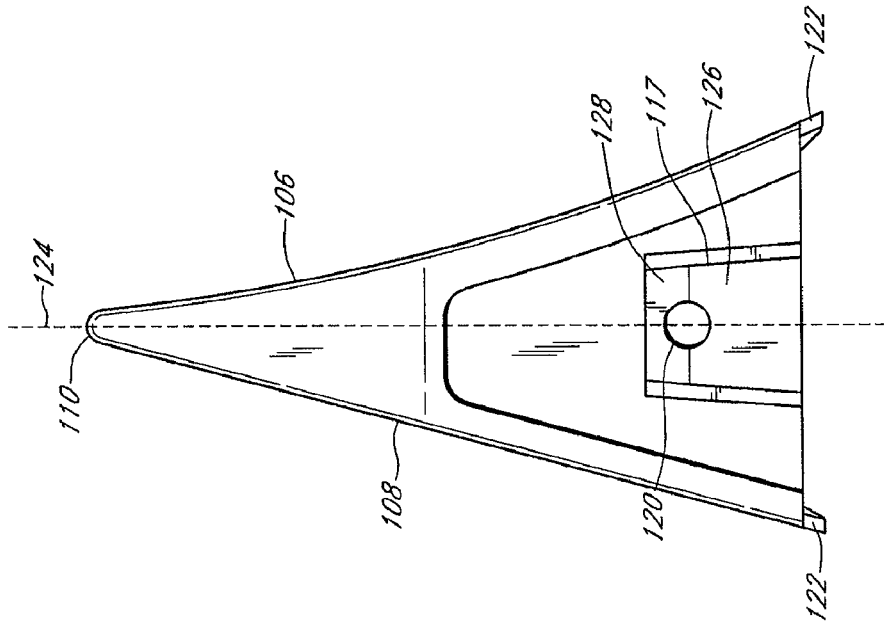
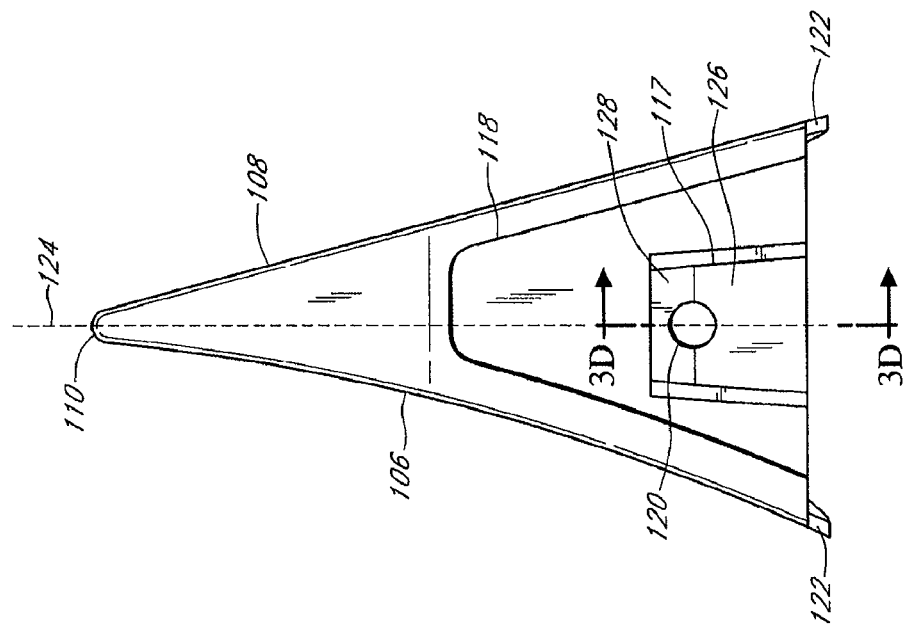
FIG. 3B
FIG. 3A

TWO-PIECE WEDGE DIVERTER GATE

RELATED APPLICATIONS

This application is a divisional of U.S. patent application Ser. No. 11/853,587, filed Sep. 11, 2007, entitled "TWO-PIECE WEDGE DIVERTER GATE", which is incorporated by reference by reference herein in its entirety.

BACKGROUND OF THE INVENTION

1. Field of the Development

This application relates to a diverter gate for sorting items. More particularly, this application relates to a two-piece diverter gate having an independently replaceable wear portion.

2. Description of the Related Art

During processing of cargo items, paper items, and bulk solids, items are conveyed along a conveyor system. The items are sorted using diverter gates which are situated along the conveyor system. The diverter gates are typically solenoid-actuated, one-piece gates. When a gate becomes worn, the entire gate and solenoid assembly must be removed and replaced.

Two-piece diverter gates exist which comprise a solenoid assembly portion and a diverter portion. The diverter portion may be removed and replaced independently of the solenoid assembly portion. These gates employ a dovetail design to join the solenoid assembly portion with the diverter portion. Due at least in part to the clearance fit of the dovetail design, these gates have the intrinsic potential for the diverter portion to loosen from the solenoid assembly portion during use. These gates also employ short screw fasteners which also allow the diverter portion to loosen from the solenoid assembly portion during use.

SUMMARY

In accordance with one embodiment, a diverter gate comprising a bracket and a flag is described. The bracket is configured to pivot about a pivot axis in response to actuation by an actuator and is configured to connect to the actuator. The bracket has a top end and a bottom end. The flag has a forward surface and a rear surface, the forward surface being configured to divert items traveling along a flow path from the flow path. The flag is configured to releasably engage with the bracket via at least a first cooperating engagement member and a second cooperating engagement member, the first and second cooperating engagement members being configured to engage with each other in a positive interference fit. The flag may pivot with the bracket about the pivot axis when the bracket is actuated by the actuator, and may be removed from the bracket without disconnecting the bracket from the actuator. In one aspect of the embodiment, the first cooperating engagement member is disposed on the bracket and the second cooperating engagement member is disposed on the flag. In another aspect of the embodiment, first cooperating member comprises a plurality of tabs. In the previous aspect, the second cooperating member comprises a plurality of receptacles configured to receive the tabs, at least one dimension of each receptacle being sized slightly smaller than a corresponding dimension of a corresponding tab. In such an aspect, the tab may be wedge-shaped. In another aspect, the tab may comprise a first sloped surface. In such an aspect, the receptacle may comprise a second sloped surface configured to mate with first sloped surface of the tab. In a further aspect, the bracket is provided with a top opening disposed at the top end of the bracket and a bottom opening disposed at the bottom end of the bracket, the top opening and the bottom opening being aligned and configured to receive a fastener passed therethrough, the fastener being configured to extend from at least the top end of the bracket to at least the bottom end of the bracket. In such an aspect, the flag may be provided with at least one flag opening configured to align with the top opening and the bottom opening of the bracket when the flag and the bracket are engaged. Additionally or in the alternative, the top opening may be provided in a top tab disposed at the top end of the bracket and the bottom opening may be provided in a bottom tab disposed at the bottom end of the bracket, the top tab and the bottom tab together comprising the first cooperating engagement member. In such an aspect, the second cooperating engagement member may comprise two receptacles disposed on the flag and configured to receive each of the top tab and the bottom tab in a positive interference fit, each receptacle being provided with a flag opening, the flag openings configured to align with the top opening and the bottom opening when the flag and the bracket are engaged so as to receive a fastener passed through the top opening, the flag openings, and the bottom opening. In the previous aspect, the top tab may comprise a downwardly-sloped face and the bottom tab may comprise an upwardly-sloped face, the downwardly-sloped face and the upwardly-sloped face being configured to apply compression to the flag when the fastener is tightened. In any of these aspects, the gate may further comprise a stiffening member configured to resist compressive forces in the flag when the fastener is tightened. The stiffening member may be aligned with the top opening and the bottom opening of the bracket when the flag and the bracket are engaged.

In accordance with another embodiment, a diverter gate for diverting items from a flow path is described. The diverter gate comprises a bracket having a top mount and a bottom mount configured to connect to and support an actuator, each of the top and bottom mounts comprising a first cooperating engagement member. The diverter gate further comprises a flag having a forward surface, a rear surface, a first end, and a second end, the forward surface being configured to generally face the flow path, each of the first and second ends comprising a second cooperating engagement member, wherein each of the first cooperating engagement members are configured to releasably and interchangeably engage with either of the second cooperating engagement members in a positive interference fit, wherein the flag may be removed from the bracket without disconnecting the bracket from the actuator, and further wherein the flag may be converted from a left-handed gate to a right-handed gate without disconnecting the bracket from the actuator. In one aspect of the embodiment, each of the first cooperating engagement members comprises a tab. In such an aspect, each of the second cooperating engagement members may comprise a receptacle, the receptacle having at least one dimension which is slightly smaller than a corresponding dimension of the tab. In any of these aspects, the gate may further comprise an elongated fastener, the top mount may have a top opening, the bottom mount may have a bottom opening, and the flag may have at least one flag opening. The fastener may be configured to pass through the top opening, the flag opening, and the bottom opening such that the fastener when inserted extends substantially across the length of the bracket. In the previous aspect, the gate may further comprise a stiffening member disposed in line with the top opening, the flag opening, and the bottom opening when the bracket is engaged with the flag, the stiffening member being configured to resist compressive forces in the flag when the fastener is tightened.

In a further embodiment, a diverter gate is described comprising means for diverting items traveling along a flow path, means for supporting the diverting means, the supporting means being configured to connect to an actuator, and means for reversibly securing the diverting means to the supporting means, the securing means being configured to allow removal of the diverting means from the supporting means without disconnecting the supporting means from the actuator. In one aspect of the embodiment, the securing means comprises a first cooperating engagement member and a second cooperating engagement member. In such an aspect, the first cooperating engagement member and the second cooperating engagement member are configured to engage with each other in a positive interference fit. In such an aspect, the first cooperating engagement member may be disposed on the diverting means and the second cooperating engagement member may disposed on the supporting means.

BRIEF DESCRIPTION OF THE DRAWINGS

FIG. 3A is an end view of the bottom end of the flag shown in FIG. 2.

FIG. 3B is an end view of the top end of the flag shown in FIG. 2.

DETAILED DESCRIPTION OF VARIOUS EMBODIMENTS

The features, aspects and advantages of the present development will now be described with reference to the drawings of several embodiments, which are intended to be within the scope of the invention herein disclosed. These and other embodiments will become readily apparent to those skilled in the art from the following detailed description of the embodiments having reference to the attached figures, the invention not being limited to any particular embodiment(s) herein disclosed.

A Basic Device

Figure 1:
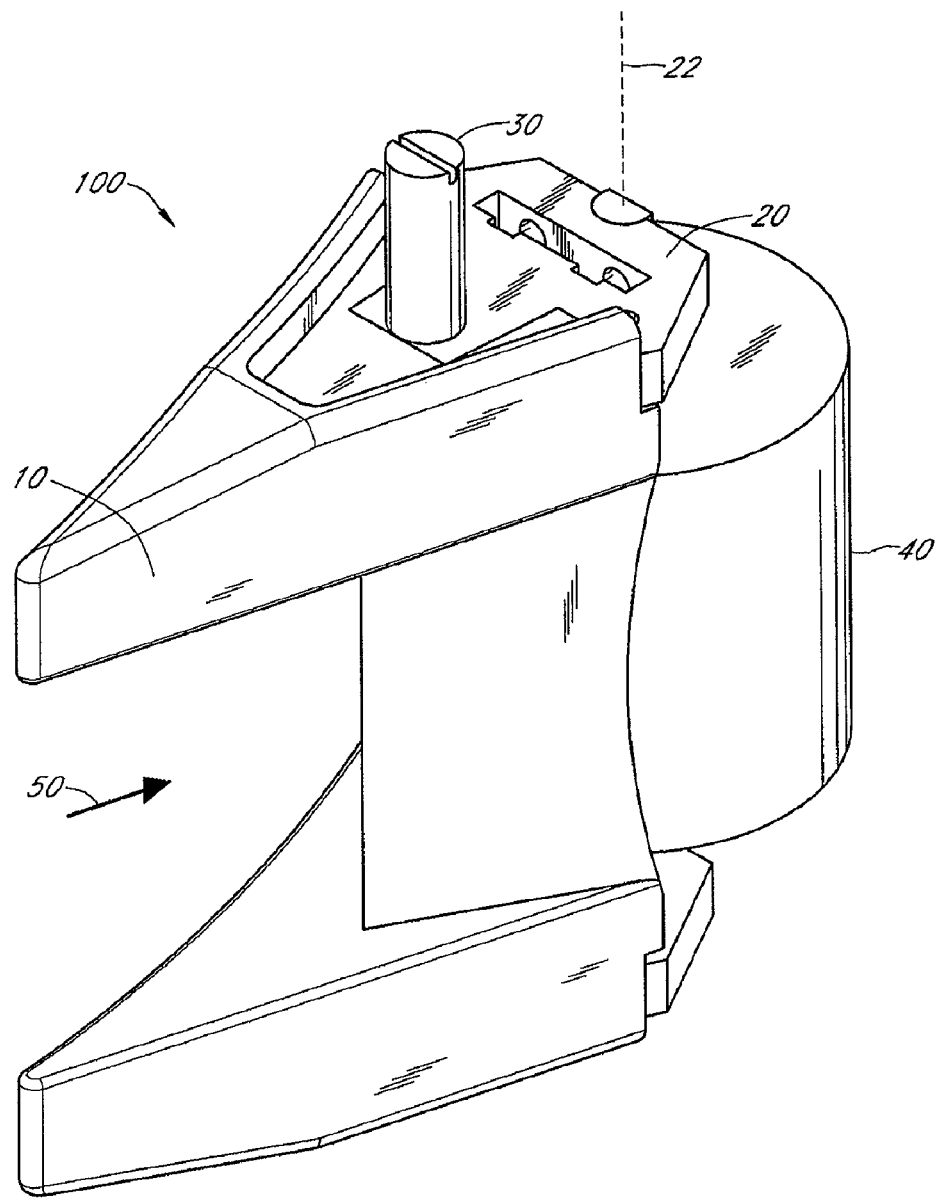
FIG. 1 is a perspective view of an embodiment of a novel two-piece diverter gate shown assembled and connected to a solenoid actuator.

FIGS. 1 through 4 illustrate a two-piece diverter gate 100 according to an embodiment of the invention. As shown in FIG. 1, the gate 100 generally includes a flag 10 and a bracket 20. The flag 10 and the bracket 20 may be fastened together with a fastener 30, as well as via interengaging structure on the flag 10 and the bracket 20, which will be described in further detail below. The bracket 20 may support an actuator 40, such as a solenoid actuator. In its unactuated state, the gate 100 may rest behind a conveyor belt (not shown) and may point generally opposite the direction of the flow path (indicated by arrow 50) of the conveyor belt. Thus, in its unactuated state, the gate 100 does not obstruct the flow path 50. When the actuator 40 is actuated, the gate 100 may pivot about a pivot axis 22 of the bracket 20 (e.g., counter-clockwise, in FIG. 1) so that at least a portion of the flag 10 extends into the flow path 50. Actuation of the gate 100 may thus serve to direct items traveling along the flow path 50 away from the flow path 50.

Flag

Figure 2:
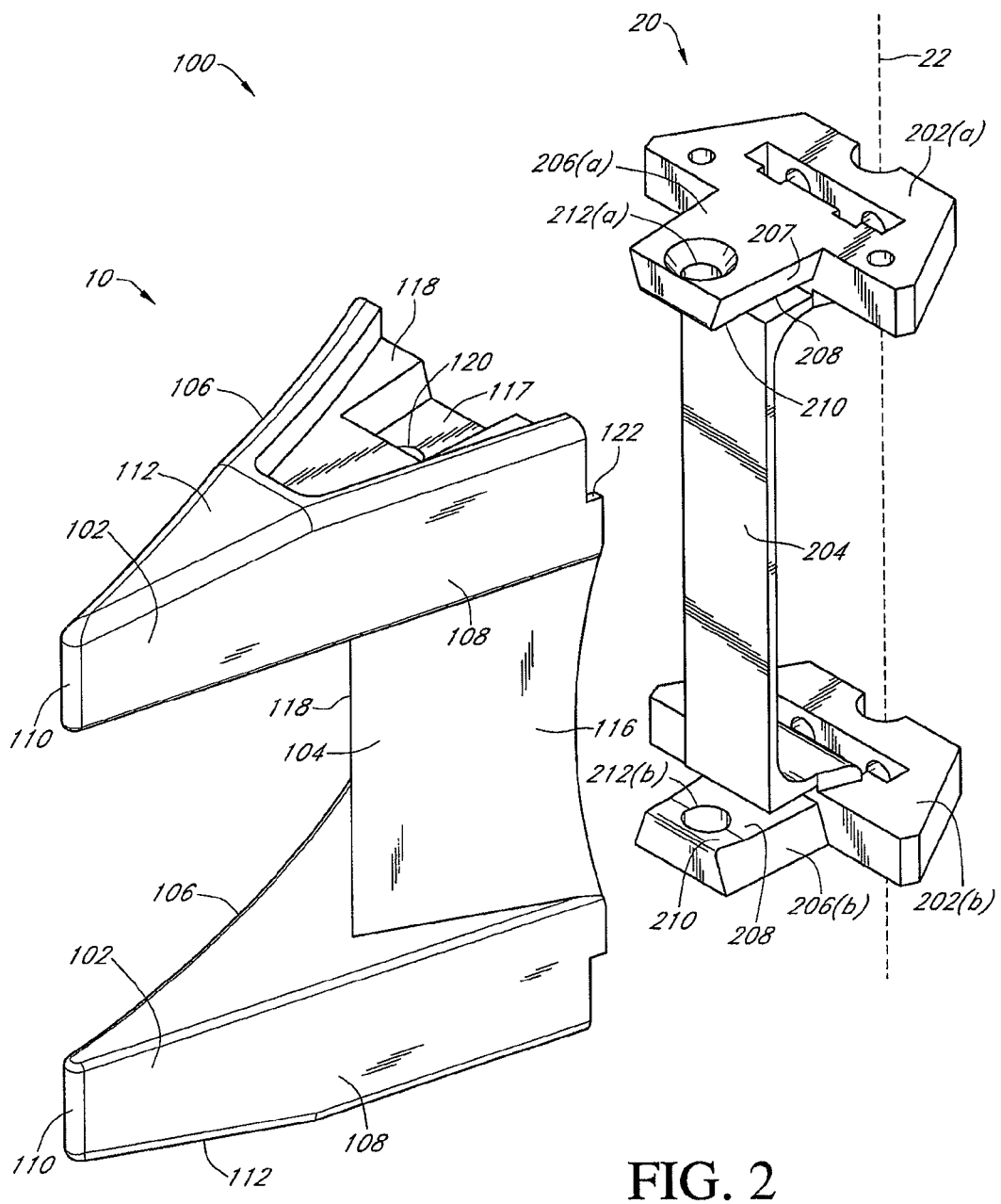
FIG. 2 is an exploded perspective view of the diverter gate of FIG. 1.

With reference now to FIG. 2, the flag 10 will be described in further detail. The flag 10 may comprise two fingers 102 connected by a web 104. The fingers 102 may be spaced apart so as to allow the fingers 102 to pass above and below the conveyor belt when the gate 100 is actuated. Each finger 102 of the flag 10 may comprise one or more first surfaces 106 and one or more second surfaces 108, disposed at an angle toward each other and meeting together at tips 110. The tips 110 may be rounded, as shown in the figure, to create a smooth edge for material being diverted to ride upon. Providing rounded tips 110 also allows for even wear in the gate 100 without the creation of sharp edges. The first surfaces 106 may be configured to face an oncoming flow of items and to direct selected items away from the flow path 50 (see FIG. 1) when the gate 100 is actuated. To achieve this function, the first surfaces 106 may have a somewhat convex shape. The second surfaces 108, on the other hand, may be essentially planar. The top and bottom ends of the fingers 102 may also include sloped faces 112 configured to allow the gate 100 to clear any nearby machinery or structure during operation. The edges of the surfaces 106, 108, and 112 may also be rounded to create a smoother ride for the material being conveyed and to allow for even wear.

The web 104 may comprise a first face 114 (not visible in FIG. 2, but facing the same general direction as the first surfaces 106 of the fingers 102) and a second face 116 (facing the same general direction as the second surfaces 108 of the fingers 102). The faces 114, 116 may be disposed at an angle toward each other and may meet at a ridge 118. Each of the faces 114, 116 may be inclined at a greater angle with respect to one another than are the corresponding surfaces 106, 108. The faces 114, 116 may thus be recessed from the surfaces 106, 108, as shown in FIG. 2. Furthermore, the first face 114 may be inclined at a more gradual angle than the second face 116, so that the ridge 118 is offset from the center of the flag 10 toward the second surfaces 108. Such a configuration may allow the tips 110 of the fingers 102 to extend into the flow path 50 when the gate 100 is actuated, while the web 104 remains behind the conveyor belt. As shown in FIG. 2, the rear edges of the faces 114, 116 may be scalloped or otherwise cut away in order to reduce weight and to allow the web 104 to clear the solenoid 40 when the gate 100 is actuated.

The flag 10 may also be provided at its top and bottom ends with one or more cutouts 117, 118, which will be described in further detail below in connection with FIGS. 3A-3B. The flag 10 may further include one or more holes 120 running between the top end of the flag 10 to the bottom end of the flag 10. Where more than one hole 120 is provided, the holes 120 may be aligned with each other so that the fastener 30 may pass through the flag 10 in either direction to assemble a right- or left-handed gate. The holes 120 may be disposed in the cutouts 117, as shown in FIG. 2, and/or may extend behind the web 104 along part or all of the web's length. Additionally, the flag 10 may include one or more abutment surfaces 122, disposed at or near the rear-facing portion of the flag 10, which are designed to cooperate with corresponding structure on the bracket 20 to resist buckling in the flag 10 when the fastener 30 is tightened.

Although the illustrated embodiment shows the cutouts 117 disposed on the flag 10 and the tabs 206 disposed on the bracket 20, it will be appreciated that this configuration may be reversed; that is, tabs may instead be disposed on the flag 10 and the bracket 20 may be provided with corresponding cutouts. In addition, although illustrated with the cutouts 117 disposed on either end of the flag 10, the cutouts may alternatively be disposed anywhere on the flag 10 consistent with their intended use, such as the rear-facing side of the flag 10 for example. Additionally or alternatively, the flag 10 and the bracket 20 may be provided with any other interengaging structure configured to provide a positive interference and/or compression fit between the flag 10 and the bracket 20.

The fingers 102 and the web 104 may comprise separate parts, or may be integrally formed. The flag 10 may be formed from any suitable lightweight material, such as injection-molded plastic.

Bracket

With continued reference to FIG. 2, the bracket 20 will now be described in further detail. The bracket 20 generally includes mounts 202(a), 202(b) connected by a strap 204. The mounts 202(a), 202(b) may be configured to connect to and support the solenoid 40 (see FIG. 1). The strap 204 may be thin and semi-flexible, allowing the mounts 202(a), 202(b) to spread apart slightly to aid installation of the solenoid 40 in the bracket 20. Although not shown, the strap 204 may also have a groove or slot cut in the center to allow clearing of any build-up which may occur between the strap 204 and the solenoid 40.

The top mount 202(a) may include (or may be connected to) a top tab 206(a) extending toward the flag 10. Similarly, the bottom mount 202(b) may include (or may be connected to) a bottom tab 206(b), which may also extend toward the flag 10. The tabs 206(a), 206(b) be configured to engage with either of the cutouts 117 on the flag 10. Each tab 206 may have a generally rectangular compound-wedge shape including, for example, sloped surfaces 207 on its sides and a flat area 208 and a sloped area 210 on its inner surface. Of course, the tabs 206 may have any other shape and configuration suitable for their intended purpose. Each tab 206 may further be provided with a hole 212 configured to receive the fastener 30. The holes 212 may be configured to align with the hole or holes 120 in the flag 10 when the flag 10 and the bracket 20 are engaged. The hole 212(a) provided in the top tab 206(a) may be countersunk to receive a tapered screwhead (see FIGS. 5A, 5B). Although not shown, the bottom hole 212(b) may be threaded, or may be provided with a threaded plastic or metal insert, to allow for tightening of the fastener 30 in the assembled gate 100, thus providing a compression fit between the flag 10 and the bracket 20 and reducing the potential for loosening to occur during operation of the gate 100. The mounts 202 and the strap 204 may comprise separate parts, or may be integrally formed. The bracket 20 may be formed from any suitable lightweight material, such as injection-molded plastic.

Further Detail

Figure 3D:
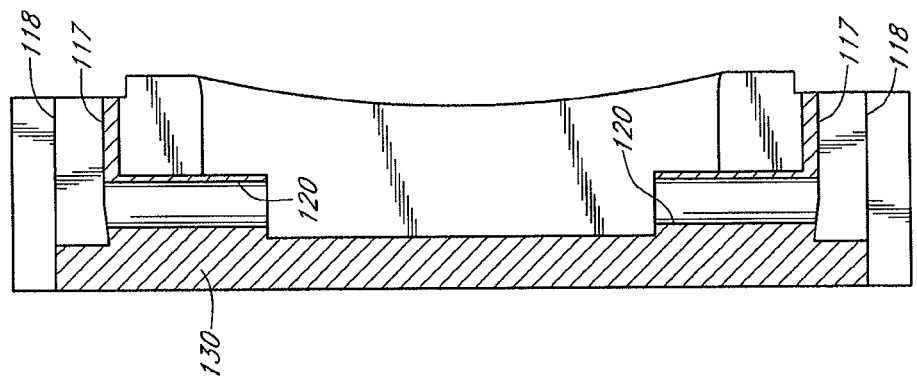
FIG. 3D is a partial section view of the flag taken along line 3D-3D of FIG. 3A.

With reference now to FIGS. 3A-3G, certain aspects of the flag 10 will now be described in further detail. As shown in FIGS. 3A and 3B, the cutouts 117 on either end of the flag 10 may be configured symmetrically about an plane 124 extending through the tips 110. By such a configuration, the cutouts 117 are able to accept either of the tabs 206(a), 206(b) on the bracket 20. Providing interchangeable and symmetrical cutouts 117 and tabs 206 allows the flag 10 to be installed with the first surfaces 106 facing and making first contact with items coming from either side of the gate 100. The flag 10 may thus be easily removed, repositioned, and reinstalled on the bracket 20, allowing an operator to reverse the direction of the gate 100 without removing or repositioning the bracket 20 or the solenoid 40.

With continued reference to FIGS. 3A and 3B, each cutout 117 may include specially-shaped areas configured to mate with corresponding areas on the tabs 206. In embodiments comprising the compound wedge shaped tabs 206, for example, the cutouts 117 may include flat areas 126 and sloped areas 128 configured to accept the correspondingly-shaped areas 208, 210 on the tabs 206 (see FIG. 2). The cutouts may also have sloped sides 130 configured to accommodate the sloped sides 207 of the tabs 206. The corresponding flat and sloped areas on the flag 10 and the bracket 20 may act to pull the tabs 206 into proper registry with the cutouts 117 when the fastener 30 is tightened. The cutouts 117 may also be dimensioned slightly smaller than the tabs 206 on the bracket 20 to allow the flag 10 and the bracket 20 to snap together in a positive interference fit. Such a configuration helps to ensure precision alignment and a secure snap fit between the flag 10 and the bracket 20 when the gate 100 is assembled, thereby limiting the risk that the flag 10 will loosen from the bracket 20 during operation of the gate 100. In addition, the interaction of the tabs 206 and the cutouts 117 may allow the installer to feel and hear when the flag 10 is properly engaged with the bracket 20. Of course, numerous other configurations for the cutouts 117 are possible, for example comprising any combination of flat, curved, stepped, and/or sloped areas.

The flag 10 may also be provided at either end with the additional cutouts 118. Together, the cutouts 117 and 118 serve to reduce the weight of the flag 10, advantageously decreasing the response time of the fully assembled gate 100 as it is directed to pivot by the solenoid 40. The cutouts 118 may be shallower than the cutouts 117, so as to avoid compromising the structural integrity of the flag 10. The cutouts 118 may extend across the ends of the flag 10 from the rear of the flag 10 to the sloped faces 112, as shown in FIG. 3A. The cutouts 118 may of course have any other configuration consistent with their intended purpose. The flag 10 may also comprise one or more abutment surfaces 122, disposed at or near the rear of each finger 102. The abutment surfaces 122 may be configured to abut the mounts 202 on the bracket 20 and resist compression across the flag 10 when the fastener 30 is tightened (see FIG. 1).

Figure 3C:
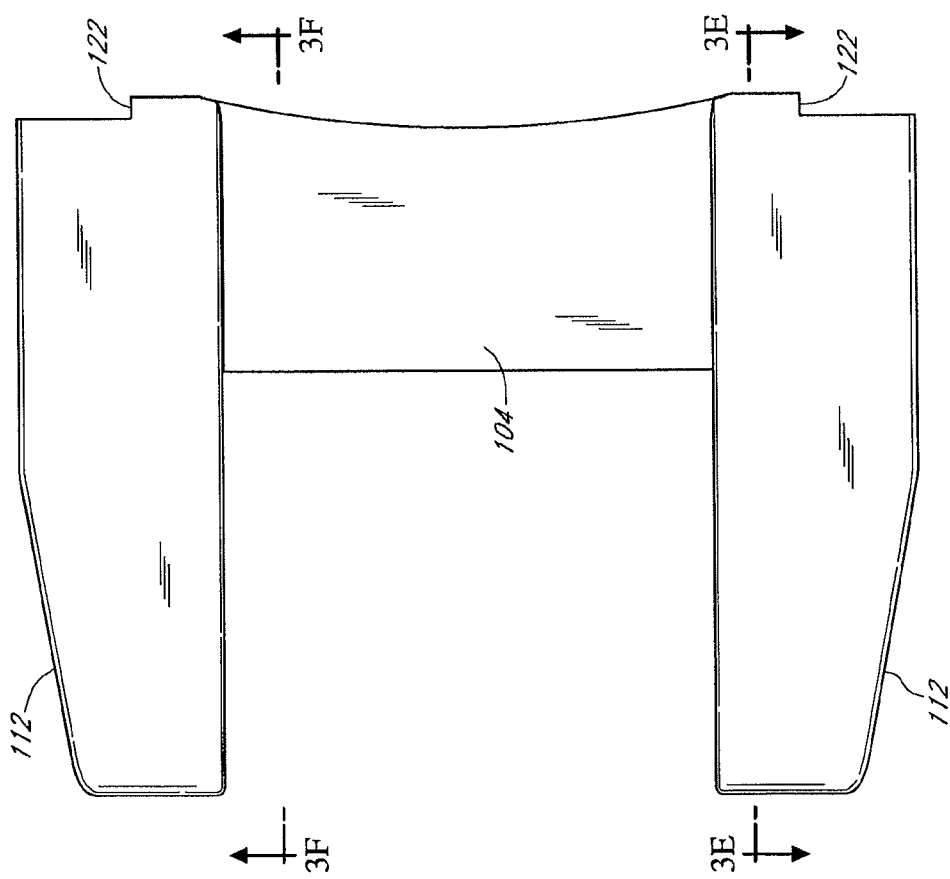
FIG. 3C a side elevation of the flag shown in FIG. 2, showing the second surfaces of the flag.
Figure 3F:
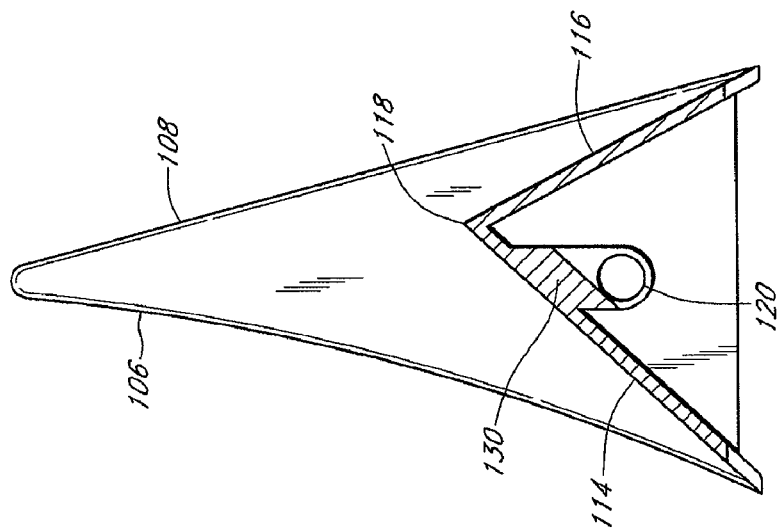
FIG. 3F is another section view of the flag taken along line 3F-3F of FIG. 3B.
Figure 3E:
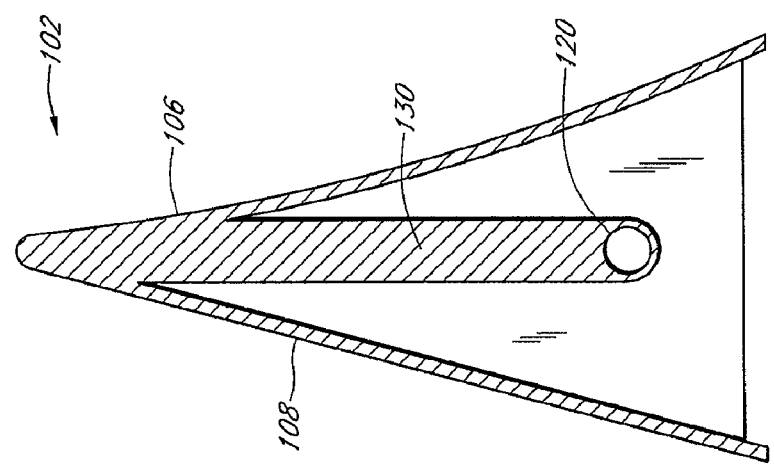
FIG. 3E is a section view of the flag taken along line 3E-3E of FIG. 3B.
Figure 3G:
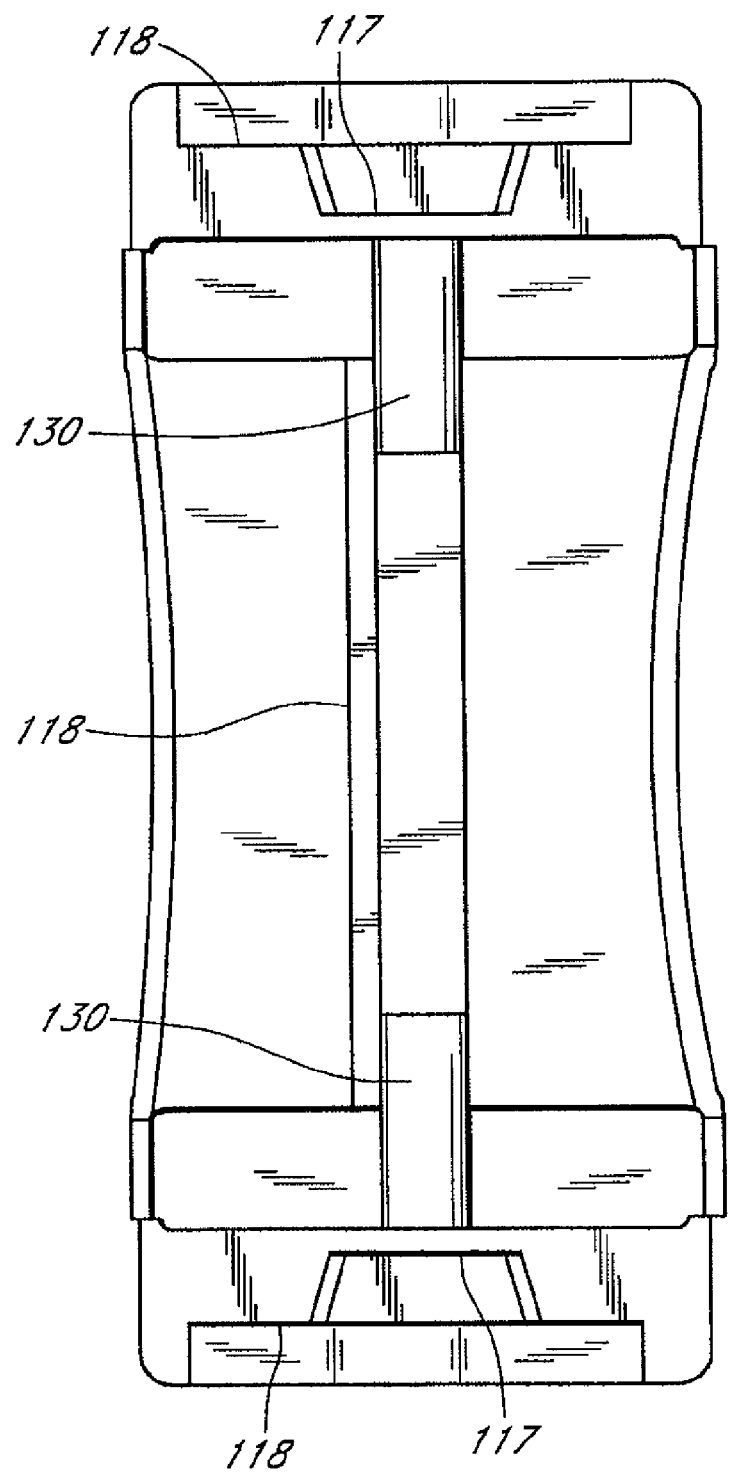
FIG. 3G is a rear view of the flag of FIG. 2 showing the bracket-facing portion of the flag.

Referring now to FIG. 3C, a side view of the flag 10 is shown, illustrating the sloped faces 112 and the scalloped rear edge of the web 104. As best seen in FIGS. 3D-3G, the flag 10 may also include a stiffening member 130 configured to provide support for the holes 120 and to reinforce the flag 10 across the web 104, particularly when the fastener 30 is tightened and compresses the tabs 206 onto the cutouts 117 of the flag 10. The stiffening member 130 may extend across the rear of the flag 10 from one finger 102 to the other. The stiffening member 130 may be disposed directly in line with the hole or holes 120 in the flag 10, and may define the hole or holes 120 in one or more regions of the flag 10. As best shown in FIG. 3E, in the region of the fingers 102, the stiffening member 130 may extend from the tips of the fingers 102 to the cutouts 117 to include the hole or holes 120. As can be seen in FIG. 3F, in the region of the web 104, the stiffening member 130 may extend from the first face 114 of the web 104. To minimize weight, the stiffening member 130 may have a width only slightly greater than the diameter of the hole or holes 120. The stiffening member 130 may further be partially or entirely cut away in the region of the web 104 (see FIG. 3D). The stiffening member may of course have any other configuration providing adequate reinforcement across the length of the flag 10 to resist any compression that may occur due to engagement of the tabs 206 with the cutouts 117 and/or due to tightening of the fastener 30.

Figure 4B:
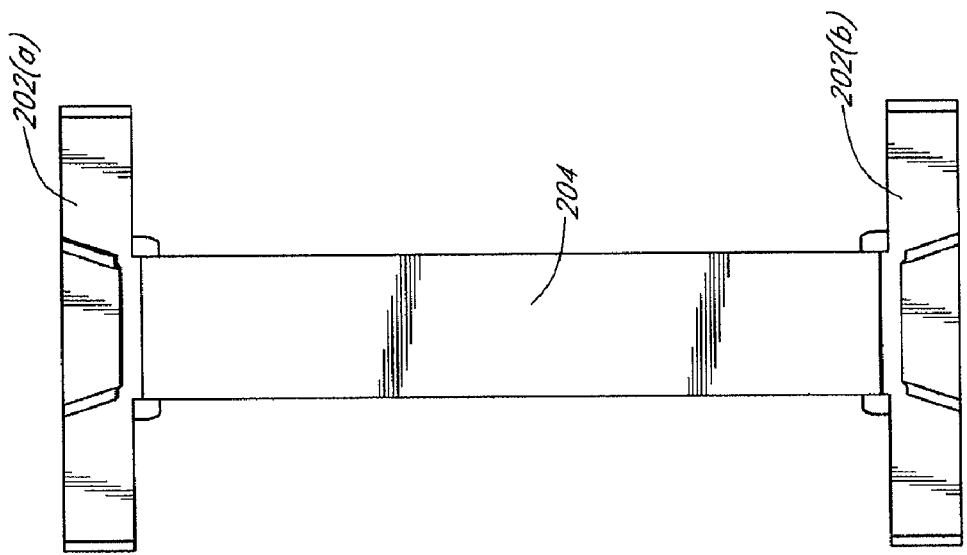
FIG. 4B is a front view of the bracket of FIG. 2 showing the flag-facing portion of the bracket.
Figure 4A:
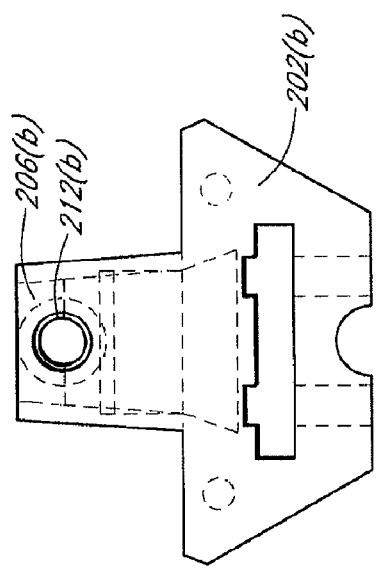
FIG. 4A is an end view of the bottom end of the bracket shown in FIG. 2.
Figures 4C, 4D:
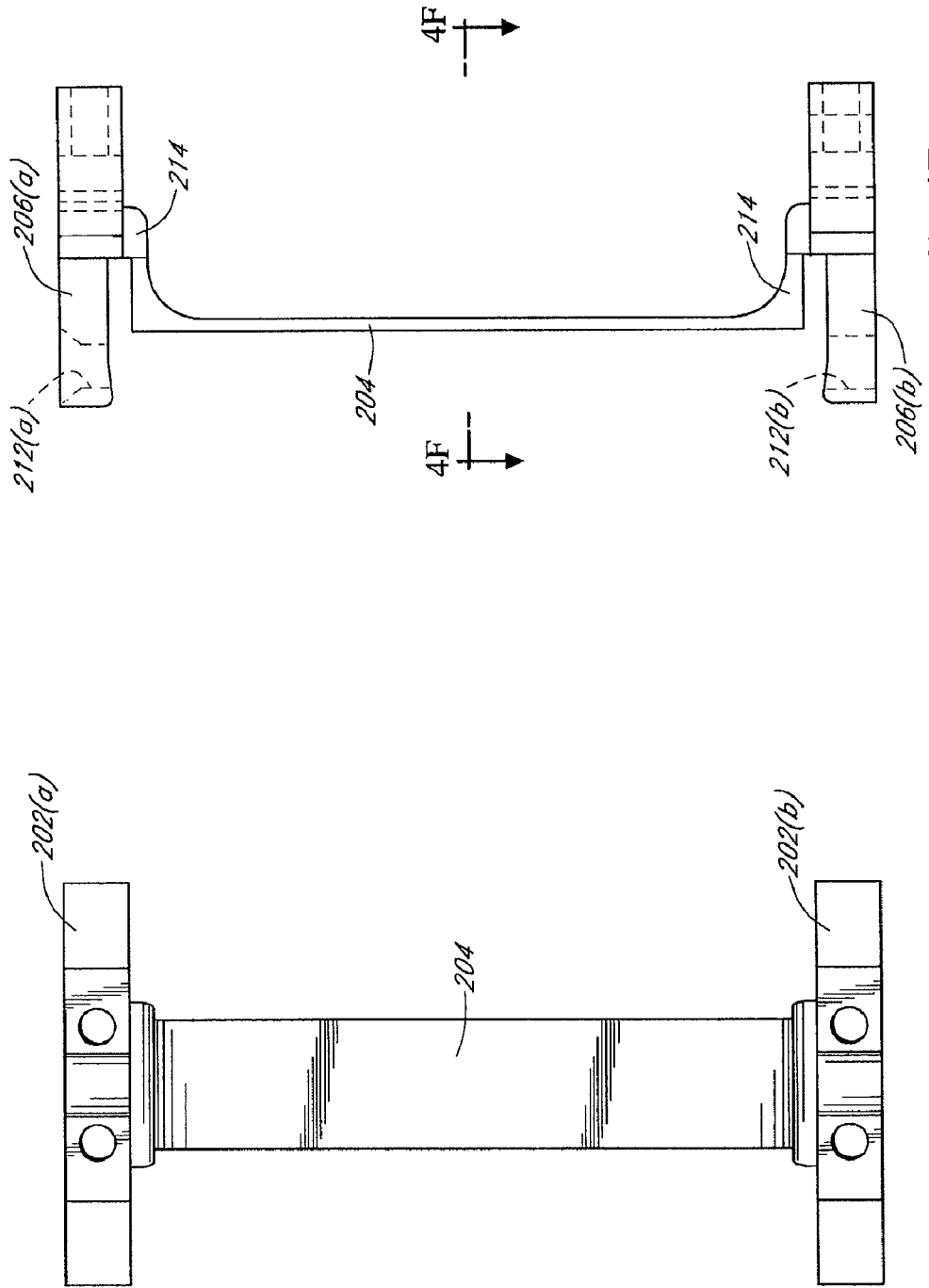
FIG. 4C is a rear view of the bracket of FIG. 2.
FIG. 4D is a side elevation of the bracket of FIG. 2.
Figure 4F:
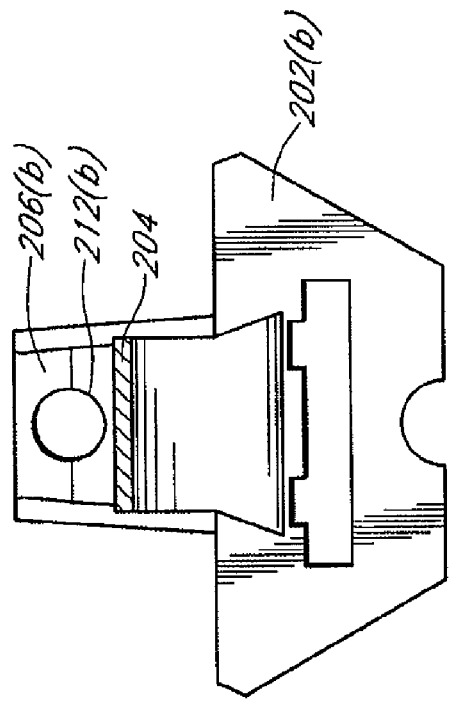
FIG. 4F is a section view of the bracket of FIG. 2, taken along line 4F-4F of FIG. 4D.
Figure 4E:
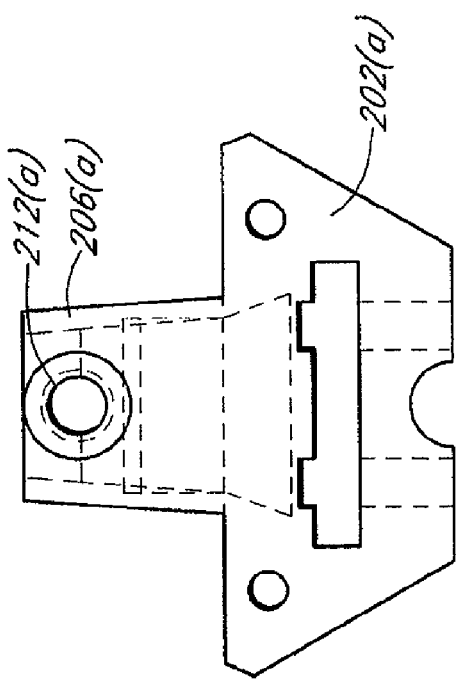
FIG. 4E is an end view of the top end of the bracket of FIG. 2.

FIGS. 4A-4F further illustrate the configuration of the bracket 20 described above. FIGS. 4A and 4E, for example, illustrate the symmetrical configuration of the tabs 206. In addition, FIG. 4D shows that the strap 204 connecting the tabs 202(a), 202(b) may be connected to the tabs 202(a), 202(b) via arms 214 configured to offset the strap 204 from the path of the holes 212 so as to allow the fastener 30 to pass along the length of the bracket 20.

Figure 5B:
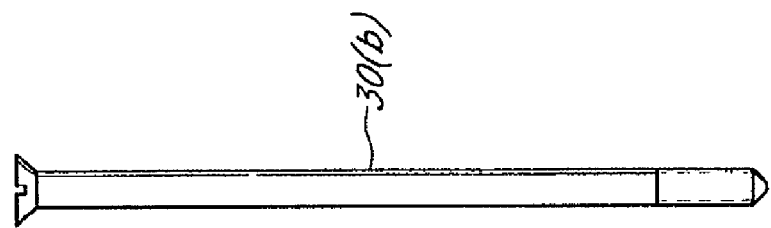
FIG. 5B is a side view of an alternative fastener adapted for use with the embodiment of FIG. 2.
Figure 5A:
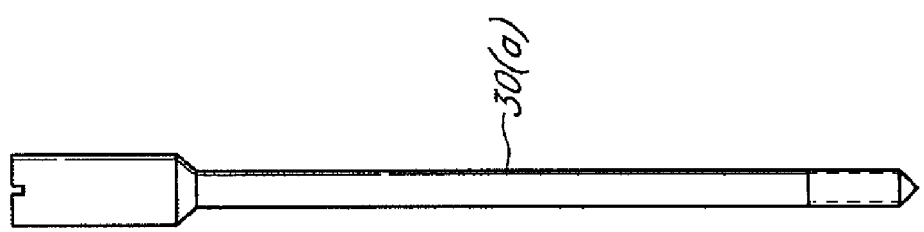
FIG. 5A is a side view of a fastener adapted for use with the embodiment of FIG. 2.

Referring now to FIGS. 5A and 5B, screw fasteners 30(a) and 30(b) are illustrated which are adapted for use with various embodiments. The fasteners 30(a), 30(b) may be designed to pass through the gate 100, from one hole 212 on the bracket 20, through the hole or holes 120 on the flag 10, and through the other hole 212 on the bracket 20. The fasteners 30(a), 30(b) may have threaded ends configured to engage with threads (or a threaded insert) provided in one or both of the holes 212, allowing the fasteners 30(a), 30(b) to tighten the engagement of the flag 10 with the bracket 20. The thumb screw 30(a) may be used in applications where an ability to hand-tighten the gate 100 is desirable. Alternatively, the flathead screw 30(b) may be used in applications where the gate 100 requires more clearance.

The fasteners 30(a), 30(b) may be formed from any material consistent with their intended use. For example, the fasteners 30(a), 30(b) may comprise a light yet durable metal such as titanium.

Assembly

To assemble the gate 100, the cutouts 117 on the flag 10 may be aligned with the tabs 206 on the bracket 20, and the flag 10 may be pressed against the bracket 20 to snap the flag 10 into place. The positive interference fit of the tabs 206 in the cutouts 117, in combination with the interaction between the correspondingly-shaped areas 126, 128 on the flag 10 and 208, 210 on the bracket 20 help to ensure proper registry of the flag 10 with the bracket 20. An installer may both hear and feel when the tabs 206 are engaged with the cutouts 117. Next, the fastener 30 may be inserted into the top hole 212(a) in the bracket 20, through the hole or holes 120 in the flag 10, and into the bottom hole 212(b) in the bracket 20. The fastener 30 may then be tightened to compress the tabs 206 against the cutouts 117. Tightening the fastener 30 may act to pull the tabs 206 into precise alignment with the cutouts 117, ensuring that the flag 10 and bracket 20 are fully engaged so that the gate 100 will pivot as one unit. The stiffening member 130 and the abutment surfaces 122 on the flag 10 serve to resist compression or buckling of the flag 10 when the fastener 30 is tightened.

To change the direction of the gate 100, or to replace a worn flag, the fastener 30 may be removed and the flag 10 separated from the bracket 20. The flag 10 may then be reversed (or replaced) and reattached to the bracket 20 in the manner described above, without removing or replacing the entire solenoid assembly. Embodiments may thus provide a gate 100 which can be converted from a right- to a left-handed diverter gate (or vice versa) without changing the specifications, material or design of the gate 100 and without removing the bracket 20 or the solenoid 40. Accordingly, embodiments reduce operational downtime, repair time, and limit the possibility of damage occurring during replacement of worn parts.

Although illustrated within the context of a side-to-side diverter gate, embodiments of the present invention may also be used in other applications, such as a vertical feed diverter gate, for which easy reversal of the gate direction and/or simple replacement of only a wear portion of the gate is desirable. It will be understood by those of skill in the art that numerous and various modifications can be made without departing from the spirit of the present invention. Therefore, it should be clearly understood that the forms of the invention described herein are illustrative only and are not intended to limit the scope of the invention.

What is claimed is:

1. A diverter gate comprising:
   means for diverting items traveling along a flow path;
   means for supporting the diverting means, the supporting means being configured to connect to an actuator; and
   means for reversibly securing the diverting means to the supporting means, the securing means being configured to allow removal of the diverting means from the supporting means without disconnecting the supporting means from the actuator,
   wherein the securing means comprises a first cooperating engagement member and a second cooperating engagement member being engaged with each other in a positive interference fit between mating surfaces of the first and second cooperating engagement members, and
   wherein the mating surfaces are configured to define alignment and a secure fit between the diverting means and the supporting means.

2. The diverter gate of claim 1, wherein the first cooperating engagement member is disposed on the diverting means and the second cooperating engagement member is disposed on the supporting means.

3. A diverter gate comprising:
   a bracket configured to pivot about a pivot axis in response to actuation by an actuator, the bracket being configured to connect to the actuator, the bracket having a top end and a bottom end;
   a flag having a forward surface and a rear surface, the forward surface being configured to divert items traveling along a flow path from the flow path, the flag being configured to releasably engage with the bracket via at least first and second cooperating engagement members located on different portions of the flag; and
   third and fourth cooperating engagement members, respectfully, located on different portions of the bracket,
   wherein the first and second cooperating engagement members are configured to engage with the third and fourth cooperating engagement members so as to be secured together,
   wherein the flag may pivot with the bracket about the pivot axis when the bracket is actuated by the actuator, and
   wherein the flag may be removed from the bracket without disconnecting the bracket from the actuator.

4. The diverter gate of claim 3, wherein the first and second cooperating members comprise a plurality of tabs.

5. The diverter gate of claim 4, wherein the third and fourth cooperating members comprise a plurality of receptacles configured to receive the tabs, at least one dimension of each receptacle being sized slightly smaller than a corresponding dimension of a corresponding tab.

6. The diverter gate of claim 5, wherein the tab is wedge-shaped.

7. The diverter gate of claim 5, wherein the tab comprises a first sloped surface.

8. The diverter gate of claim 7, wherein the receptacle comprises a second sloped surface configured to mate with first sloped surface of the tab.

9. The diverter gate of claim 3, wherein the bracket is provided with a top opening disposed at the top end of the bracket and a bottom opening disposed at the bottom end of the bracket, the top opening and the bottom opening being aligned and configured to receive a fastener passed therethrough, the fastener being configured to extend from at least the top end of the bracket to at least the bottom end of the bracket.

10. The diverter gate of claim 9, wherein the flag is provided with at least one flag opening, the at least one flag opening being configured to align with the top opening and the bottom opening of the bracket when the flag and the bracket are engaged.

11. The diverter gate of claim 9, wherein the top opening is provided in a top tab disposed at the top end of the bracket and the bottom opening is provided in a bottom tab disposed at the bottom end of the bracket, the top tab and the bottom tab together comprising the first cooperating engagement member.

12. The diverter gate of claim 11, wherein the second cooperating engagement member comprises two receptacles disposed on the flag and configured to receive each of the top tab and the bottom tab in a positive interference fit, each receptacle being provided with a flag opening, the flag openings configured to align with the top opening and the bottom opening when the flag and the bracket are engaged so as to receive a fastener passed through the top opening, the flag openings, and the bottom opening.

13. The diverter gate of claim 12, wherein the top tab comprises a downwardly-sloped face and the bottom tab comprises an upwardly-sloped face, the downwardly-sloped face and the upwardly-sloped face being configured to apply compression to the flag when the fastener is tightened.

14. The diverter gate of claim 13, further comprising a stiffening member configured to resist compressive forces in the flag when the fastener is tightened.

15. The diverter gate of claim 14, wherein the stiffening member is aligned with the top opening and the bottom opening of the bracket when the flag and the bracket are engaged.

16. A diverter gate for diverting items from a flow path, the diverter gate comprising:
a bracket having a top mount and a bottom mount configured to connect to and support an actuator, each of the top and bottom mounts comprising a first cooperating engagement member; and
a flag having a forward surface, a rear surface, a first end, and a second end, the forward surface being configured to generally face the flow path,
wherein each of the first and second ends comprises a second cooperating engagement member,
wherein each of the first cooperating engagement members are configured to releasably and interchangeably engage and be secured to either of the second cooperating engagement members,
wherein the flag may be removed from the bracket without disconnecting the bracket from the actuator, and
wherein the flag may be converted from a left-handed gate to a right-handed gate without disconnecting the bracket from the actuator.

17. The diverter gate of claim 16 wherein each of the first cooperating engagement members comprises a tab.

18. The diverter gate of claim 17, wherein each of the second cooperating engagement members comprises a receptacle, the receptacle having at least one dimension which is slightly smaller than a corresponding dimension of the tab.

19. The diverter gate of claim 18, further comprising an elongated fastener, the top mount having a top opening, the bottom mount having a bottom opening, and the flag having at least one flag opening, the fastener being configured to pass through the top opening, the flag opening, and the bottom opening such that the fastener when inserted extends substantially across the length of the bracket.

20. The diverter gate of claim 19, further comprising a stiffening member disposed in line with the top opening, the flag opening, and the bottom opening when the bracket is engaged with the flag, the stiffening member being configured to resist compressive forces in the flag when the fastener is tightened.

* * * * *